(12) United States Patent
Schnepel et al.

(10) Patent No.: US 7,948,981 B1
(45) Date of Patent: May 24, 2011

(54) METHODS AND APPARATUS FOR REPRESENTING AUDIO DATA

(75) Inventors: Soenke Schnepel, Luetjensee (DE); Stefan Wiegand, Hamburg (DE); Sven Duwenhorst, Hamburg (DE); Volker W. Duddeck, Hamburg (DE); Holger Classen, Hamburg (DE)

(73) Assignee: Adobe Systems Incorpoated, San Jose, CA (US)

( * ) Notice: Subject to any disclaimer, the term of this patent is extended or adjusted under 35 U.S.C. 154(b) by 829 days.

(21) Appl. No.: 11/585,289

(22) Filed: Oct. 23, 2006

(51) Int. Cl.
*G10H 7/00* (2006.01)

(52) U.S. Cl. .......... 370/390; 370/235; 370/476; 84/611; 84/609; 84/615

(58) Field of Classification Search .................. 370/390, 370/484, 487
See application file for complete search history.

(56) References Cited

U.S. PATENT DOCUMENTS

| | | | | |
|---|---|---|---|---|
| 5,633,985 A | * | 5/1997 | Severson et al. | 704/267 |
| 5,728,962 A | * | 3/1998 | Goede | 84/609 |
| 6,400,378 B1 | * | 6/2002 | Snook | 715/716 |
| 2001/0012304 A1 | * | 8/2001 | Agraharam et al. | 370/487 |
| 2002/0189430 A1 | * | 12/2002 | Mukojima | 84/615 |
| 2005/0058430 A1 | * | 3/2005 | Nakamura et al. | 386/52 |
| 2007/0261537 A1 | * | 11/2007 | Eronen et al. | 84/611 |

* cited by examiner

*Primary Examiner* — Dang T Ton
*Assistant Examiner* — Pamit Kaur

(57) ABSTRACT

An audio storage architecture allows an audio management application to manipulate and recombine segments of a musical piece such that the resulting finished composition includes parts (segments) from the decomposed piece, typically a song, adjustable for length by selectively replicating particular parts and combining with other parts such that the finished composition provides a similar audio experience in the predetermined duration. The architecture defines the parts with part variations of independent length, identified as performing a function of starting, middle, (looping) or ending parts. Each of the parts provides a musical segment that is integratable with other parts in a seamless manner that avoids audible artifacts (e.g. "pops" and "crackles") common with conventional mechanical switching and mixing. Each of the parts further includes attributes indicative of the manner in which the part may be ordered, whether the part may be replicated or "looped" and modifiers affecting melody and harmony of the rendered finished composition piece.

23 Claims, 6 Drawing Sheets

METHODS AND APPARATUS FOR REPRESENTING AUDIO DATA

BACKGROUND

Conventional sound amplification and mixing systems have been employed for processing a musical score from a fixed medium to a rendered audible signal perceptible to a user or audience. The advent of digitally recorded music via CDs coupled with widely available processor systems (i.e. PCs) has made digital processing of music available to even a casual home listener or audiophile. Conventional analog recordings have been replaced by audio information from a magnetic or optical recording device, often in a small personal device such as MP3 and Ipod® devices, for example. In a managed information environment, audio information is stored and rendered as a song, or score, to a user via speaker devices operable to produce the corresponding audible sound to a user.

In a similar manner, computer based applications are able to manipulate audio information stored in audio files according to complex, robust mixing and switching techniques formerly available only to professional musicians and recording studios. Novice and recreational users of so-called "multimedia" applications are able to integrate and combine various forms of data such as video, still photographs, music, and text on a conventional PC, and can generate output in the form of audible and visual images that may be played and/or shown to an audience, or transferred to a suitable device for further activity.

SUMMARY

Digitally recorded audio has greatly enabled the ability of home or novice audiophiles to amplify and mix sound data from a musical source in a manner once only available to professionals. Conventional sound editing applications allow a user to modify perceptible aspects of sound, such as bass and treble, as well as adjust the length by performing stretching or compressing on the information relative to the time over which the conventional information is rendered.

Conventional sound applications, however, suffer from the shortcoming that modifying the duration (i.e. time length) of an audio piece changes the tempo because the compression and expansion techniques employed alter the amount of information rendered in a given time, tending to "speed up" or "slow down" the perceived audio (e.g. music). Further, conventional applications cannot rearrange discrete portions of the musical score without perceptible inconsistencies (i.e. "crackles" or "pops") as the audio information is switched, or transitions, from one portion to another.

Accordingly, configurations here substantially overcome the shortcomings presented by conventional audio mixing and processing applications by defining an architecture and mechanism of storing audio information in a manner operable to be rearranged, or recombined, from discrete parts of the audio information into a finished musical composition piece of a predetermined length without detectable inconsistencies between the integrated audio parts from which it is combined. Accordingly, configurations herein identify a decomposed set of audio information in a file format indicative of a time and relative position of parts of the musical score, or piece, and identify, for each part, a function and position in the recombined finished composition. Each of the stored parts is operable to be recombined into a seamless, continuous composition of a predetermined length providing a consistent user listening experience despite variations in duration.

The audio storage architecture allows an audio editing application to manipulate and recombine segments of a musical piece such that the resulting finished composition includes parts (segments) from the decomposed piece, typically a song, adjustable for length by selectively replicating particular parts and combining with other parts such that the finished composition provides a similar audio experience in the predetermined duration. The audio storage architecture defines the parts with part variations of independent length, and identified as performing a function of starting, middle, (looping) or ending parts. Each of the parts provides a musical segment that is integratable with other parts in a seamless manner that avoids audible artifacts (e.g. "pops," clicks or "phase erasement") common with conventional mechanical switching and mixing. Each of the parts further includes attributes indicative of the manner in which the part may be ordered, whether the part may be replicated or "looped" and modifiers affecting melody and harmony of the rendered finished composition piece, for example.

In further detail, the method of storing audio information in a form adapted for rearrangement as defined herein include identifying a musical score of audio information, and decomposing the score into a plurality of parts, such that each of the parts defines a segment of the score operable as a rearrangeable element. The audio editing application assigns a function to each of the parts, such that the function indicative of the order of the part as a rearrangeable element, in which the parts are responsive to a rearranger operable to recombine the parts in a particular order based on the function. The rearranged parts have a combined aggregate duration based on a user specified time.

Each of the parts includes at least one part variation, such that each of the part variations have a different length to allow for recombinations to suit the desired length, however each of the part variations is based on the part and are operable to provide a similar audio output. Thus, the part variations of a part provide a similar rendered listening experience.

In the example arrangement, decomposing includes computing, for each part, at least one track indicative of a subset of sources generating the audio information in the part. Recombining includes selecting, based on the function, a next part variation from the part variations, such that the next part variation has a corresponding function (e.g. clip) and corresponding duration such that the total duration of all the parts is substantially equal to an intended duration. Selection of a part involves identifying the tracks and clips within the part variation, as discussed further below. The rearranger rearranges the parts by ordering and replicating the selected part variations to generate an aggregation of parts having a predetermined duration, and iterates selecting part to add next part variations to the aggregation of parts. Therefore, rearranging involves combining a plurality of the parts based on the length such that a total length of all the parts substantially equals a desired duration.

In an example configuration, representation of a score of music as defined herein includes identifying segments of the score adaptable as recombinable parts of audio information, such that each of the parts is operable to follow other particular parts in a sequence of parts, and determining, for each of the parts, a function indicative of an ordering of the parts in a recombined audio piece. The function (e.g. starting, ending, looping) is specific to particular clips within the part selected for inclusion. Recombining also includes determining, for each of the parts, a type indicative of a relative location of each of the parts in a recombined audio piece, and may include computing part variations of the parts, such that each of the part variations of a part has a different duration. The duration of the part variations is adapted to compute a time duration of a recombined sequence of parts to meet an intended total duration of the resulting recombined parts. The decomposer enumerates at least one track for each of the part variations, such that each track operable to render audio content from one or more clips, and stores the parts and corresponding variations, including the tracks and clips, in a manner accessible to a rearranger operable to rearrange the part variations according to a desired predetermined duration.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system or execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional sound applications suffer from the shortcoming that modifying the duration (i.e. time length) of an audio piece tends to change the tempo because the compression and expansion techniques employed alter the amount of information rendered in a given time, tending to "speed up" or "slow down" the perceived audio (e.g. music). Further, conventional methods employing mechanical switching and mixing tend to introduce perceptible inconsistencies (i.e. "crackles" or "pops") as the audio information is switched, or transitions, from one portion to another. Configurations discussed below substantially overcome the shortcomings presented by conventional audio mixing and processing applications by defining an architecture and mechanism of storing audio information in a manner operable to be rearranged, or recombined, from discrete parts of the audio information. The resulting finished musical composition has a predetermined length from the constituent parts, rearranged by the rearranger without detectable inconsistencies between the integrated audio parts from which it is combined. Accordingly, configurations herein identify a decomposed set of audio information in a file format indicative of a time and relative position of parts of the musical score, or piece, and identify, for each part, a function and position in the recombined finished composition. Each of the stored parts is operable to be recombined into a seamless, continuous composition of a predetermined length providing a consistent user listening experience despite variations in duration.

Figure 1:
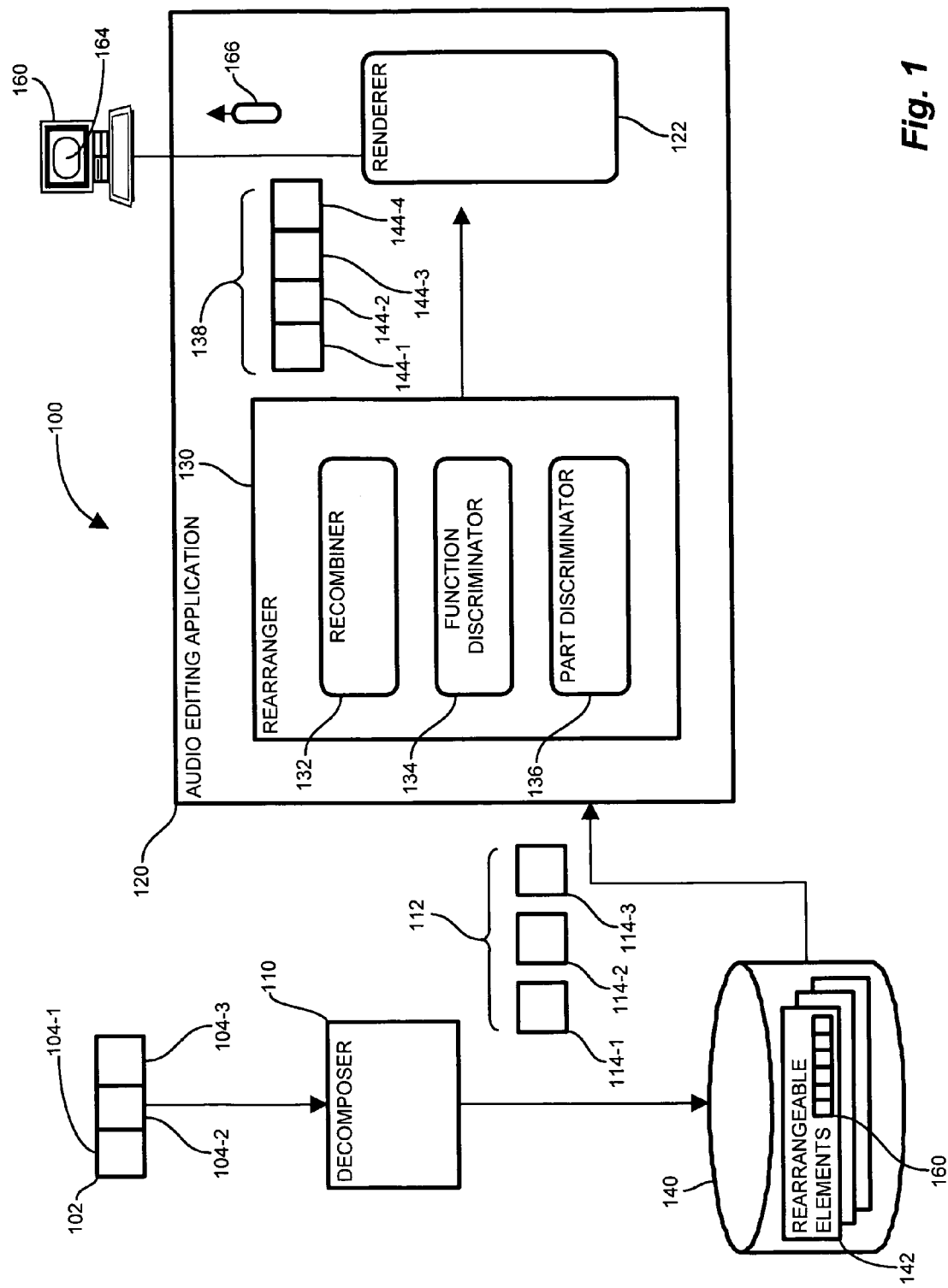
FIG. 1 is a context diagram of an exemplary audio development environment suitable for use with the present invention.

FIG. 1 is a context diagram of an exemplary audio development environment suitable for use with the present invention. Referring to FIG. 1, an audio editing environment 100 includes a decomposer 110 and an audio editing application 120. In an example configuration, the audio editing application 120 may be the SOUNDBOOTH application, marketed commercially by Adobe Systems Incorporated, of San Jose, Calif. The audio editing application 120 includes a rearranger 130 for rearranging, or recombining, parts of a song, and a renderer 122 for rendering a finished (rearranged) audio composition 166 on a user device 160. The decomposer 110 is operable to receive a musical piece, or score 102, and decompose segments 104-1 . . . 104-3 corresponding to various portions of a song. Such portions include, for example, intro, chorus, verse, refrain, and bridge. The rearranger 130 receives the decomposed song 112 (or song) as a series of parts 114 corresponding to each of the segments 104 in the original score 102. The resulting rendered audio composition 166 is a rearranged composition having constituent parts 114 processed by the rearranger 130 as discussed further below. Processing by the rearranger 130 includes reordering and replicating parts 114 to suit a particular time constraint, and modifying characteristics of the parts such as melody, harmony, intensity and volume. A graphical user interface 144 receives user input for specifying the rearranging and reordering of the parts 114 in the song.

The rearranger 130 further includes a recombiner 132, a function discriminator 134 and a part discriminator 136. The recombiner 130 is operable to rearrange and reorder the parts 114 into a composition 138 of reordered segments 144-1 . . . 144-4 (144 generally) corresponding to the parts 114. Each of the segments 144 is a part variation having a particular duration, discussed further below. Each part variation 144 includes tracks having one or more clips, also discussed below. The function discriminator 134 identifies a function of each of the parts 114 that indicates the order in which a particular part 114 may be recombined with other parts 114. In the example shown herein, the functions include starting, ending, and looping (repeatable) elements. Alternate parts having other functions may be employed; the recombinability specified by the function is granular to the clip and need not be the same for the entire part. The function refers to the manner in which the part, clip, or loop is combinable with other segments, and may be specific to the clip, or applicable to all clips in the part. The part discriminator 136 determines a time duration of each of the parts 114, and further identifies part variations 144 having different durations, as discussed further below. In the example configuration below, the part discriminator 136 computes time durations of a plurality of parts 114 to assemble a composition 138 having a specified time length, or duration, received from the GUI.

In such a system, it is desirable to vary the length of a musical score, yet not deviate from the sequence of verses and intervening chorus expected by the listener. The rearranged composition 138 rendered to a user maintains an expected sequence of parts 114 (based on the function and type) to meet a desired time duration without varying the tempo by "stretching" or "compressing" the audio. It should be noted that the concept of a "part" as employed herein refers to a time delimited portion of the piece, not to a instrument "part" encompassing a particular single instrument.

The rearranger 130 employs the decomposed song 112, which is stored as a set of files indexed as rearrangable elements 142-1 . . . 142-N (142 generally) on a local storage device 140, such as a local disk drive. A song may also have several song variations of a different length, each of which decomposes into rearrangeable elements 142. The rearrangable elements 142 collectively include parts, part variations, tracks and clips, discussed further below in FIG. 3. In an example arrangement, the rearrangable elements 142 define a set of files named according to a naming convention indicative of the elements, and may include a part or variations of a part, for example. Other suitable file arrangements may be employed for storing the elements 142.

Therefore, in an example arrangement, the rearranger 130 computes for a given song variation (time length variant of a song) the length of the song (rearranged composition) 138 by combining all parts 114 contained in this song variation 138. For each part 114 all part variations are iteratively attempted in combination with any part variation of the other parts 114 of the song variation. If the resulting song variation duration is smaller than the desired length, the repetition count for all parts is incremented part by part. The rearranger 130 iterates as long as the resulting duration is equal or larger than the desired length. During the iteration part variations 144 are marked to be removed from search if the duration keeps being under the desired length. The 138 rearranger searches for a combination which gives the minimal error towards the desired length. (149, FIG. 3) In an automatic mode, discussed further below, the result/best fit of each song variation is compared as such that the resulting minimal error and the repetition count over all parts of a song variation is chosen, where both values weighted equally are minimal.

Figure 2:
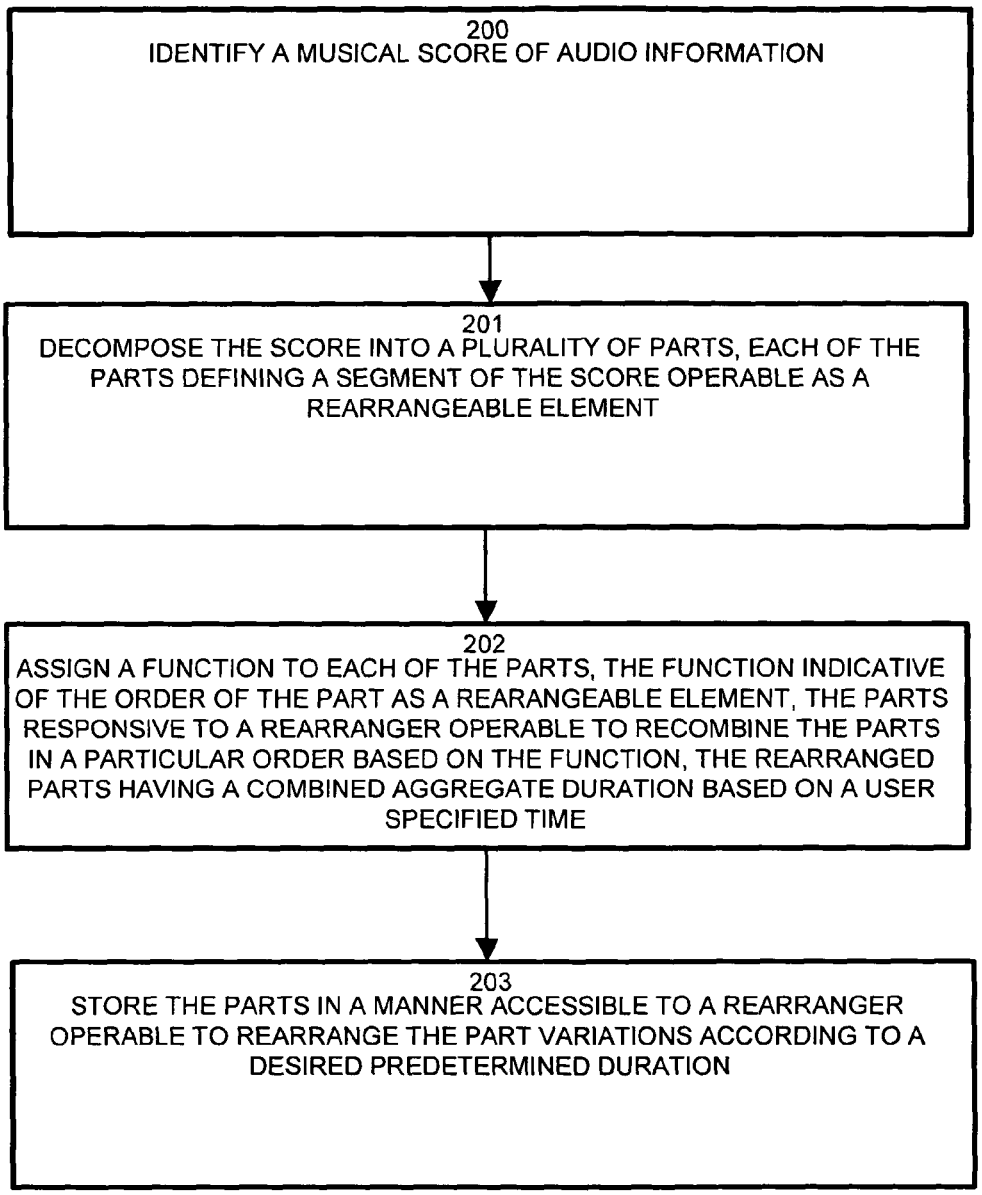
FIG. 2 is a flowchart of song rearrangement in the environment of FIG. 1.

FIG. 2 is a flowchart of song rearrangement in the environment of FIG. 1. Referring to FIGS. 1 and 2, the method of storing audio information in a form adapted for rearrangement as defined herein includes, at step 200, identifying a musical score 102 of audio information, and decomposing the score into a plurality of parts 114, such that each of the parts 114 defines a segment 104 of the score operable as a rearrangable element 160, as depicted at step 201. The musical score 104 is a piece or song of music from an audio source, typically a single song of a moderate (e.g. 3-5 minutes) length, but any suitable score of a particular length may be obtained from an audio source.

The rearranger 130 assigns a function to each of the parts, such that the function is indicative of the order of the part as a rearrangable element 160. The parts 114 are responsive to the rearranger 130 for recombining the parts 114 in a particular order based on the function, in which the rearranged parts have a combined aggregate duration based on a user specified time, as shown at step 202. The function indicates, for example, whether a part 114 appears first, last, or in the middle of a sequence, and whether the part 114 may be looped, or concatenated together in multiple iterations. Thus, a simple rearrangement has parts with functions of start, multiple iterations of a looping part, and an ending part, discussed further below with respect to table 1. Additional refinements may be performed based on the type of a part 114, such as a verse, chorus or bridge, in which multiple verses may be separated by a chorus, for example. The decomposer 110 stores the resulting parts 142 in a manner accessible to a rearranger 130 operable to rearrange the part variations 144 according to a desired predetermined duration, as shown at step 203. In the example configuration the parts 114 are stored as rearrangeable elements 160 in a local disk drive 140 accessible to both the decomposer 110 and the audio editing application 120.

Figure 3:
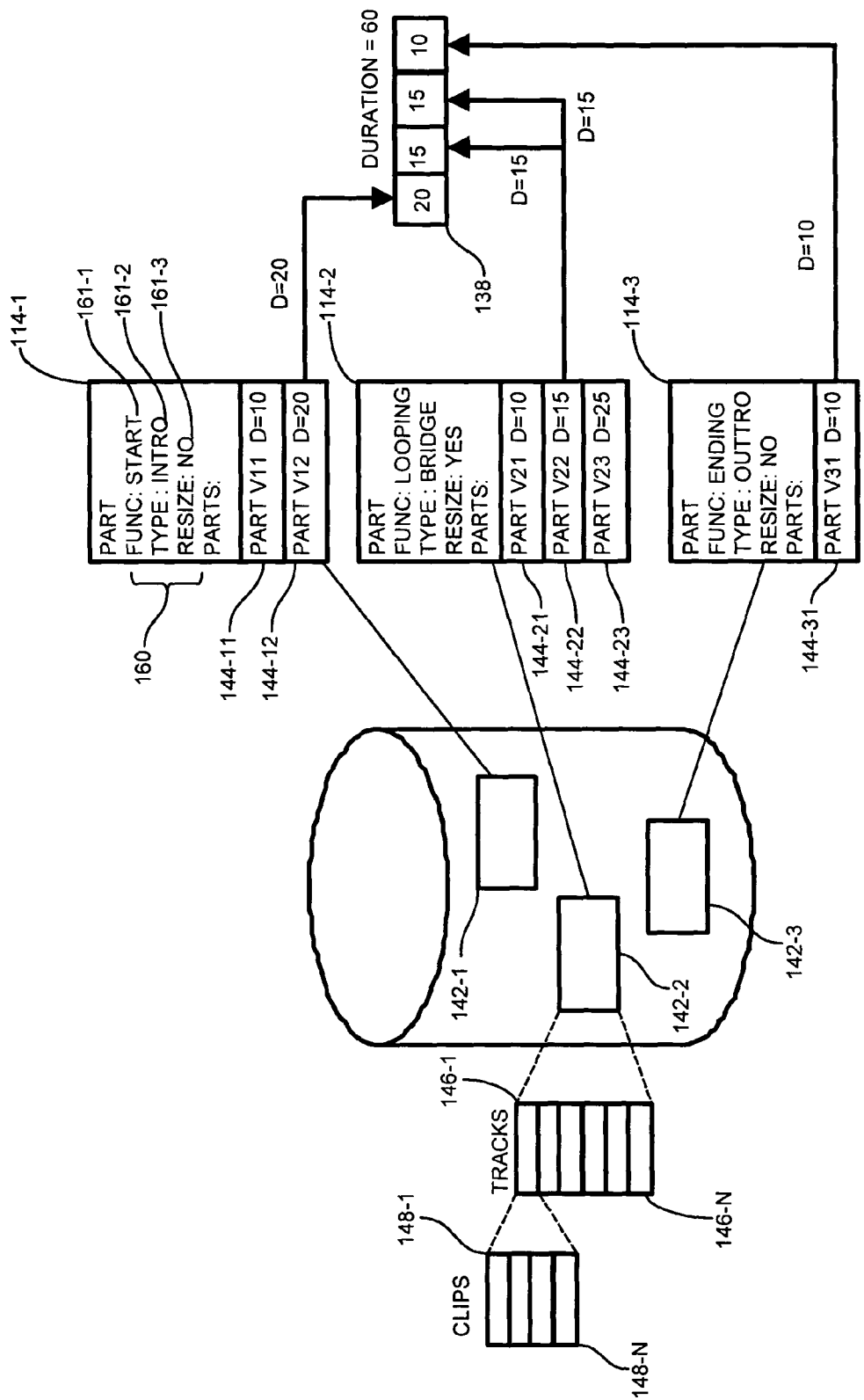
FIG. 3 is a block diagram of parts of a song being modified according to the flowchart of FIG. 2.

FIG. 3 is a block diagram of parts of a song (score) 102 being modified according to the flowchart of FIG. 2. Referring to FIGS. 1 and 3, the local drive 140 stores the rearrangable elements 142 as parts 114-1 . . . 114-3. The rearranger 130 accesses the elements 142 as files to extract the parts 114. Each part 114 has one or more part variations 144-11 . . . 144-31 (144-N generally). The part variations 144-N are a time varied segment 104 that generally provide a similar rendered experience and have the same part function and part type. The set of rearrangable elements 142 therefore provides a range of time varied, recombineable elements 142 that may be processed and rearranged by the rearranger 130 to generate a rearranged composition 138 that provides a similar rendered experience with variable total duration. Each part further includes one or more tracks 146-1 . . . 146-N, and each track may include one or more clips 148-1 . . . 148-N. One particular usage is matching a soundtrack to a video segment. The soundtrack can be matched to the length of the video segment without deviating from the song structure of verses separated by a refrain/chorus and having an introductory and a finish segment (part).

The parts 114 further include attributes 160, including a function 161-1, a type 161-2, and a resizability 161-3. The parts 114, or part variations 144, each have one or more tracks, each of which includes one or more clips. The attributes may be common to the part, or may be specific to particular tracks or clips within the part, shown in Table I below. The function 161-1 is indicative of the ordering of the parts in the composition 138. In the example configuration, the function indicates a starting, ending, or looping part. The example part 114 includes 3 clips, one each for a starting, ending, and looping part. The type 161-2 is a musical designation of the part in the particular song, and may indicate a chorus, verse, refrain, bridge, intro, or outtro, for example. The type indicates the musical flow of one part into another, such as a chorus between verses, or a bridge leasing into a verse, for example. The resizability 161-3 indicates whether a part 114 may be replicated, or looped multiple of times, to increase the duration of the resulting aggregate parts 114. This may be related to the function 161-2 (i.e. looping), although not necessarily.

In FIG. 3, the rearranged composition 138 has four parts 144-1 . . . 144-4. A desired time of 60 seconds is sought by the recombiner 132. The function discriminator 134 identifies part 114-1 as having a start function, part 114-2 as having a looping function, being of type bridge, and part 114-3 as having an ending function. The part discriminator 136, responsible for selecting the various length part variations 144, selects part 144-12, having a duration of 20, two iterations (loops) of part 144-22, having a duration of 15 each, thus totaling 30 seconds, and part variation 144-31, having a duration of 10, totaling 60 seconds. An alternate composition 138 might include, for example, 5 parts having part types of intro, verse, chorus, verse, an outtro, or other combination that preserves the sequence specified by the type, iterations specified by the function, and part variations that aggregate (total) to the desired time.

An example data structure operable for use with the above configuration is shown in table I:

TABLE I

```
Song:
    = 1. .N song variations (e.g. time variants of song)
        Song variation =
            1. .N parts (e.g. starting, ending, looping segment,)
            Part = {e.g. segment}
                part_type : (chorus, refrain, bridge, verse, intro)
                1. .N part variations (time duration varied)
                    part variation =
                        duration : integer
                        resizability : (resizable,non-resizable)
                        1. .N tracks {e.g. instrument}
                            track = 1. .3 clips (i.e. piece of audio content)
                            part quality : (intensity, melody, harmony, volume)
                            part_function : (starting, ending, looping)
```

Figure 4:
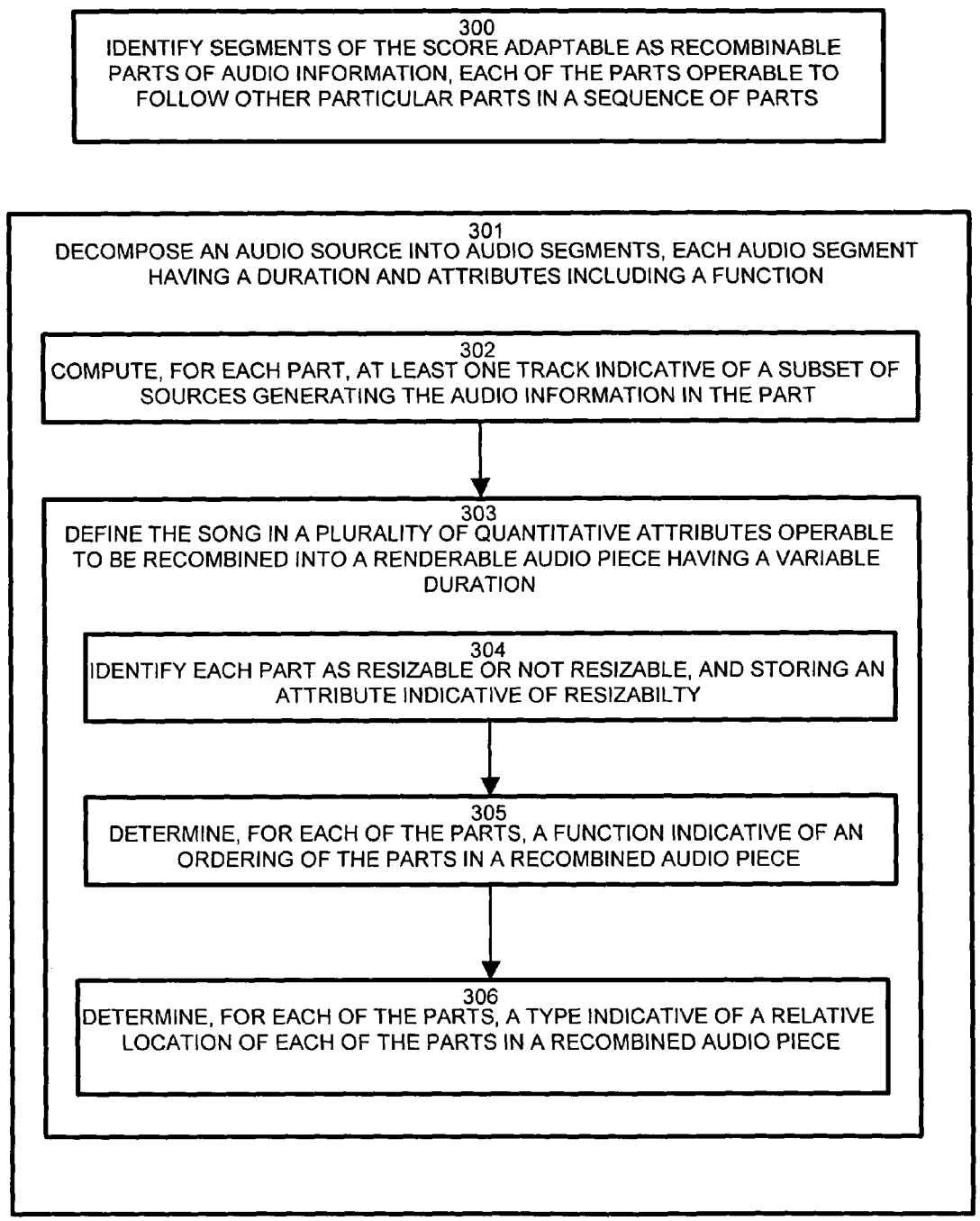
FIGS. 4-6 are a flowchart of rearrangement of parts of a song in according to the system in FIG. 3.
Figure 5:
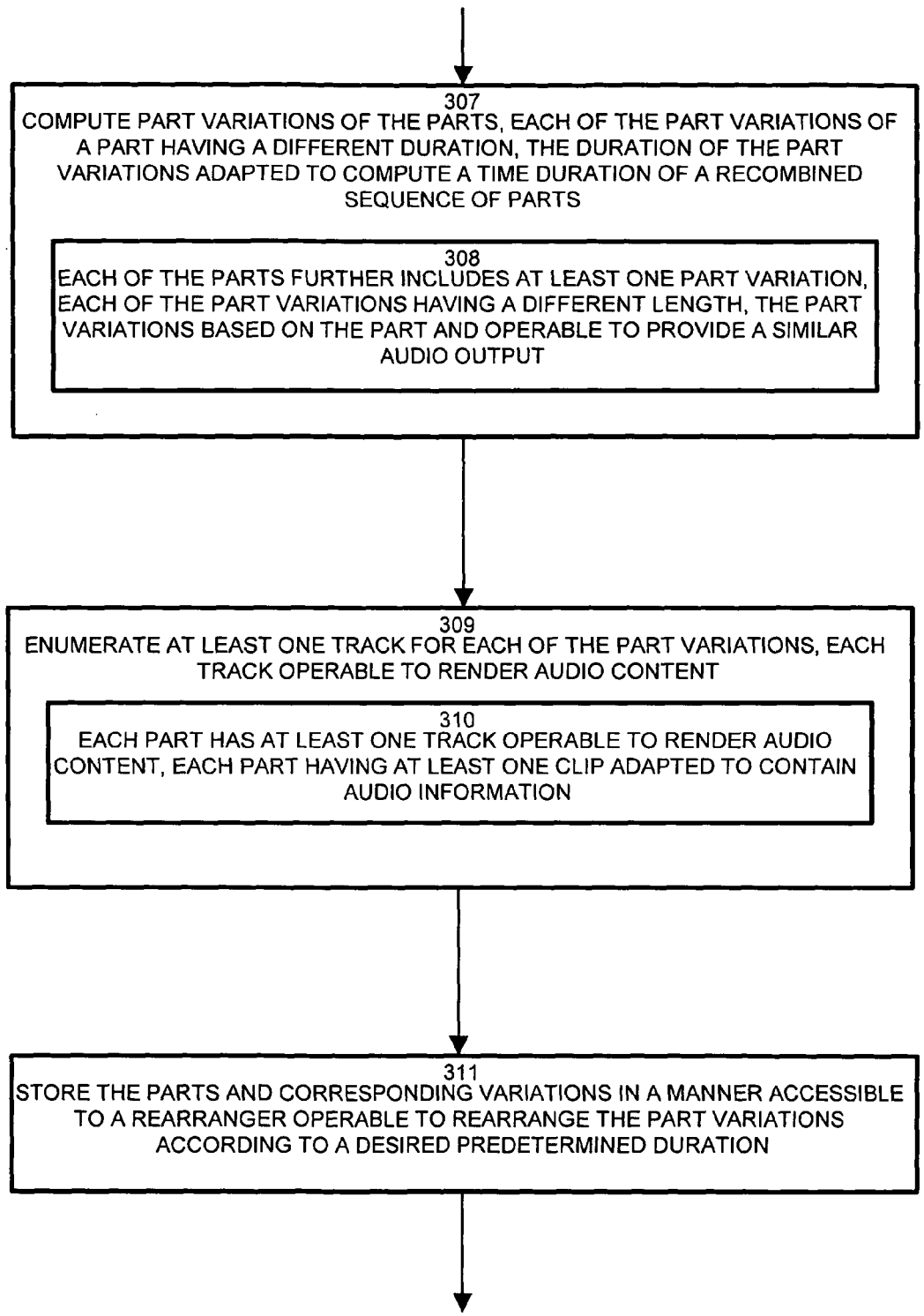
Figure 6:
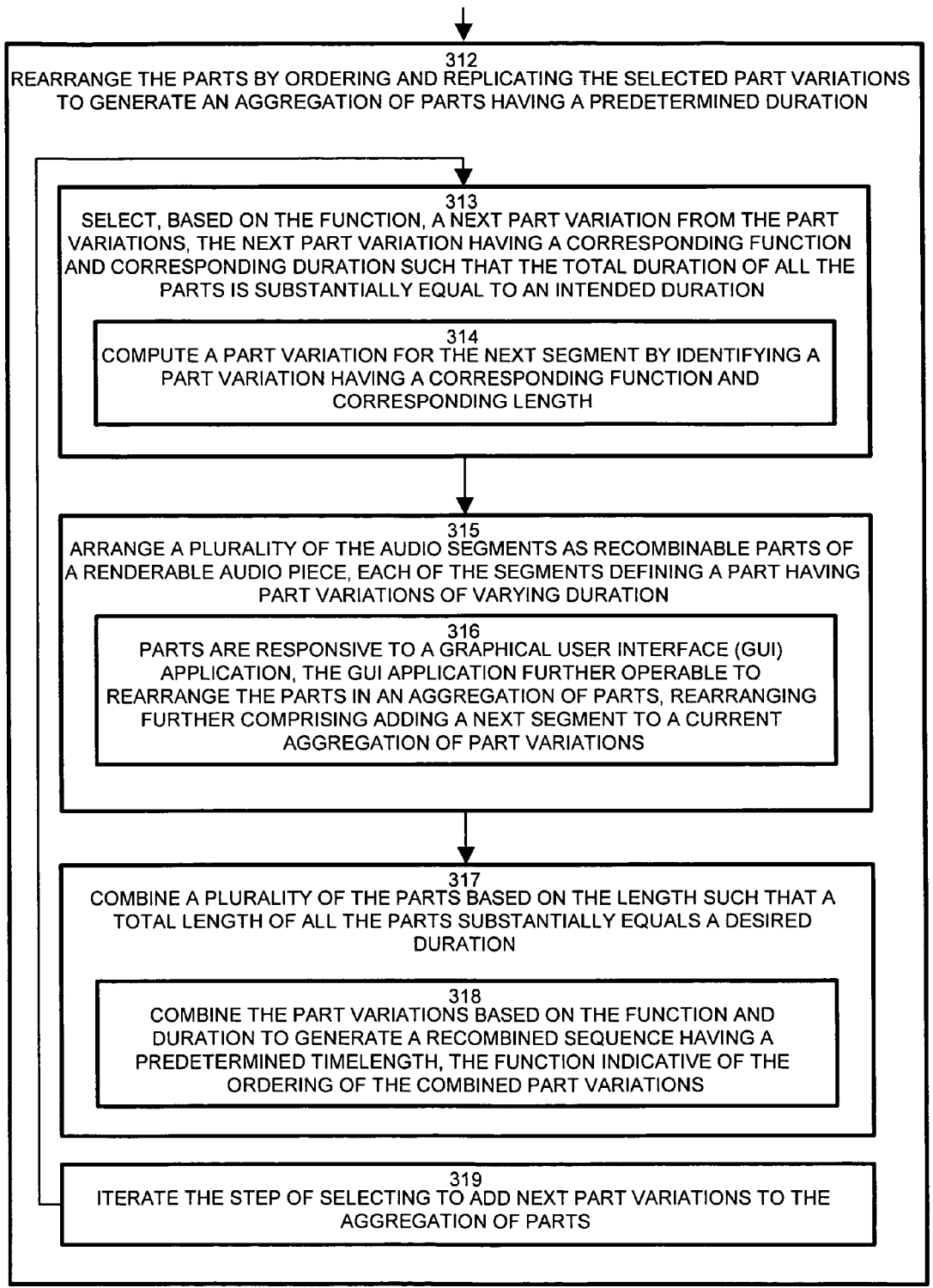

FIGS. 4-6 are a flowchart of rearrangement of parts of a song in according to the system in FIG. 3. Referring to FIGS. 3-6, the decomposer 110 identifies segments 104 of the score 102 adaptable as recombinable parts 114 of audio information, such that each of the parts 114 is operable to follow other particular parts in a sequence of parts, as depicted at step 300. The decomposer 110 is operable to demarcate a piece of music 102 into segments 104, each demarcated segment representing a part 114 having a particular duration D and recombinable as a whole. Thus, the parts 114 demarcated (identified) by the decomposer 110 represent the units that form the rearranged composition 138.

From the identified segments 104, the decomposer 110 begins processing renderable audio segments 104 by decomposing an audio source (i.e. score 102) into audio segments 104, such that each audio segment 104 has a duration and attributes 160 including a function 161, as disclosed at step 301. Therefore, identifying segments 104 includes decomposing the musical score 102 into parts based 114 on the duration D and the attributes 160 of the parts, in which the attributes 160 further define renderable features of the audio contained in the part 114.

The attributes 160 of each segment 104 are employed in rearranging the segments 104, and are discussed further below. Thus, the segments 104 may be considered time sequenced portions of the piece of music 102. Decomposing further include computing, for each part 114, at least one track indicative of a subset of sources generating the audio information in the part 114, as depicted at step 302. A track 146 is a subset of musical sources, and may include an individual instrument or collection of instruments such as horns or strings.

Decomposing further defines the song 102 in a plurality of quantitative attributes 160 operable to be recombined into a renderable audio piece, or composition 138, having a variable duration, as disclosed at step 303. The decomposer identifies each part 114 as resizable or not resizable, and stores an attribute 161-3 indicative of reliability, as shown at step 304. The resizability attribute 161-3 indicates if the part may be repeated, or looped, in succession to extend the length of the composition 138 by a multiple of the individual part 114. The attributes 160 also include modifiers to the audio contained in the part 114 such that the modifiers are operable to selectively modify a subset of the tracks 146 included in the part. The modifiers may be included as additional attributes 160, and are augmented by techniques discussed in copending patent application Ser. No. 11/585,352, entitled "METHODS AND APPARATUS FOR MODIFYING AUDIO INFORMATION", filed concurrently, incorporated herein by reference.

The decomposer 110 determines, for each of the parts 114, a function 161-1 indicative of an ordering of the parts 114 in a recombined audio piece 138, as depicted at step 305. The function 161-1 indicates a relative order to the parts 114, such as which types 161-2 may follow and/or precede other parts 114, and if the part can be duplicated as in a looping manner. Typical functions include starting, ending, and looping.

The decomposer 110 determines, for each of the parts 114, a type 161-2 indicative of a relative location of each of the parts 114 in a recombined audio piece 138, as depicted at step 306. The type identifies a particular part as a qualitative musical portion, such as a chorus, refrain or bridge, and may further specify ordering such as a chorus or refrain interspersed between verses. In many cases the function 161-1 or type 161-2 may indicate resizability, as for a type value of looping, or for a chorus (type) that is repeatable.

The decomposer 110 stores the decomposed segments 104 as rearrangable elements 142 on the storage device 140. The decomposer 110 also computes part variations 144 of the parts 114, such that each of the part variations of a part has a different duration, in which the duration D of the part variations 144 is adapted to compute a time duration of a recombined sequence 138 of parts 114, as disclosed at step 307. Each of the parts 114 stored as rearrangable elements 160 further includes at least one part variation 144, such that each of the part variations 144 has a different length (D), in which the part variations 144 are based on the part and are operable to provide a similar audio output, as disclosed at step 308. Thus, each of the part variations 144 has a similar sound and provides a similar rendered experience to a user, but in a different duration to allow for recombining to suit a particular total length (duration) for the finished composition 138. The stored rearrangable elements 160 also enumerate at least one track 146 for each of the part variations 144, in which each track is operable to render audio content 309. Typically, each of the part variations 144 of the same part has the same number of tracks 146. Each part 114 has one or more tracks 146 operable to render audio content, and each part has at least one clip adapted to contain audio information, as depicted at step 310. A clip is a single sound source, such as a single instrument. The decomposer 110 stores the parts 114 and corresponding part variations 144 in a manner accessible to a rearranger 130 operable to rearrange the part variations 144 according to a desired predetermined duration, as disclosed at step 311.

The rearranger 130 receives the rearrangable elements 142 of the decomposed song 112 as a set 112 of parts 114. The rearranger 130 rearranges the parts by ordering and replicating the selected part variations 144 to generate an aggregation of parts 138 having a predetermined duration, as depicted at step 312. This includes selecting, based on the function 161-1, a next part variation 144 from the part variations 144. The selected next part variation 144 has a corresponding function 161-1 and corresponding duration D such that the total duration of all the parts is substantially equal to an intended duration, as depicted at step 313. Accordingly, the function discriminator 134 computes and retrieves a part variation 144 for the next segment 104 by identifying a part variation 144 having a corresponding function and corresponding length (duration) D, as shown at step 314. The selected next part variation 144 performed by the function discriminator 134 may be according to a sequence of part types 161-2, a set of rules of allowable sequences, or other suitable means, and is discussed further in copending U.S. patent application Ser. No. 11/585,325, entitled METHODS AND APPARATUS FOR RENDERING AUDIO DATA, filed concurrently, incorporated herein by reference.

The recombiner 132 arranges a plurality of the audio segments 104 as recombinable parts 114 of a renderable audio piece 138, such that each of the segments 104 defining a part 114 having part variations 144 of varying duration D, stored as rearrangable elements 142, as depicted at step 315. In an example configuration, the parts 114 are responsive to a graphical user interface (GUI) application 164, such that the GUI application 164 is further operable to rearrange the parts 114 in an aggregation of parts, in which rearranging further includes adding a next segment 104 to a current aggregation 138 of part variations 144, the next segment 104 comprising a part variation 144, as shown at step 316.

Rearranging further comprises combining a plurality of the parts based on the length such that a total length of all the parts substantially equals a desired duration, as depicted at step 317. Accordingly, the part discriminator 136 combines the part variations 144 based on the function 161-1 and duration D to generate a recombined sequence 138 having a predetermined time length, such that the function 161-1 is indicative of the ordering of the combined part variations 138, as shown at step 318. The recombiner 132 iterates the step of selecting to add next part variations 144 to the aggregation of parts 138 until the desired total duration is achieved in the finished composition 138, as depicted at step 319. Control reverts to step 313 as appropriate, and the finished composition 138 is sent 166 to the user device 160 for presentation on the GUI 164. Further details about successive processing by the GUI are disclosed in the copending U.S. patent application Ser. No. 11/585,352.

Those skilled in the art should readily appreciate that the programs and methods for representing and processing audio information as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The disclosed method may be in the form of an encoded set of processor based instructions for performing the operations and methods discussed above, and may be operable on a memory or data structure operable for indexed, or register based access as a set of ordered bins of storage. Such delivery may be in the form of a computer program product having a computer readable medium operable to store computer program logic embodied in computer program code encoded thereon, for example. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for representing and processing audio information has been particularly shown and described with references to embodiments thereof, it will be understood by those skilled in the art that various changes in form and details may be made therein without departing from the scope of the invention encompassed by the appended claims.

What is claimed is:

1. A method of storing audio information in a form adapted for rearrangement comprising:
    identifying a musical score of audio information;
    decomposing the score into a plurality of parts, each of the parts defining a segment of the score operable as a rearrangable element;
    assigning a function to each of the parts, the function indicative of the order of the part as a rearrangable element, the parts responsive to a rearranger operable to recombine the parts in a particular order based on the function;
        the parts having types denoting the functions of a start, middle and end, the middle parts resizable such that they are repeatable to provide a consistent rendered listening experience over a desired predetermined duration, the rearranged parts having a combined aggregate duration based on a user specified time, the assigned function defining a relation between each part of the plurality of parts, each part having a type, to indicate which part types may follow other part types in the particular order of the recombined sequence; and
    identifying each part as resizable or not resizable, and storing an attribute indicative of resizability, the resizeability attribute indicating if the part is arrangeable in an iterative manner.

2. The method of claim 1 wherein each of the parts further includes at least one part variation, each of the part variations having a different length, the part variations based on the part and operable to provide a similar audio output.

3. The method of claim 2 wherein decomposing further comprises computing, for each part, at least one track indicative of a subset of sources generating the audio information in the part.

4. The method of claim 3 further comprising:
    selecting, based on the function, a next part variation from the part variations, the next part variation having a corresponding function and corresponding duration such that the total duration of all the parts is substantially equal to an intended duration;
    rearranging the parts by ordering and replicating the selected part variations to generate an aggregation of parts having a predetermined duration; and
    iterating the selecting to add next part variations to the aggregation of parts.

5. The method of claim 4 wherein rearranging further comprises combining a plurality of the parts based on the length such that a total length of all the parts substantially equals a desired duration.

6. A method of representing a score of audio information comprising:
    identifying segments of the score adaptable as recombinable parts of audio information, each of the parts configured to follow other particular parts in a sequence of parts, the parts having types denoting the functions of a start, middle and end, the middle parts resizable such that they are repeatable to provide a consistent rendered listening experience over a desired predetermined duration;
    determining, for each of the parts, the function indicative of an ordering of the parts in a recombined audio piece, the determined function defining a relation between each part of the plurality of parts, each part having a type, to indicate which part types may follow other part types in the particular order of the recombined sequence;

determining, for each of the parts, a type indicative of a relative location of each of the parts in a recombined audio piece;

identifying each part as resizable or not resizable, and storing an attribute indicative of resizability;

computing part variations of the parts, each of the part variations of a part having a different duration, the duration of the part variations adapted to compute a time duration of a recombined sequence of parts;

enumerating at least one track for each of the part variations, each track operable to render audio content; and storing the parts and corresponding variations in a manner accessible to a rearranger configured to rearrange the part variations according to the desired predetermined duration.

7. The method of claim 6 wherein identifying segments further comprises decomposing a musical score into parts based on the duration and the attributes of the parts, the attributes further defining renderable features of the audio contained in the part.

8. The method of claim 7 wherein the attributes include modifiers to the audio contained in the part, the modifiers operable to selectively modify a subset of the tracks included in the part.

9. The method of claim 6 wherein the parts are responsive to a graphical user interface (GUI) application, the GUI application further operable to rearrange the parts in an aggregation of parts, rearranging further comprising adding a next segment to a current aggregation of part variations, the next segment comprising a part variation, further including computing a part variation for the next segment by identifying a part variation having a corresponding function and corresponding length.

10. The method of claim 9 wherein each part has at least one track operable to render audio content, each part having at least one clip adapted to contain audio information.

11. An audio editing device operable to perform an audio executing application for storing audio information in a form adapted for rearrangement comprising:

a decomposer operable to identifying a musical score of audio information and further operable to decomposing the score into a plurality of parts, each of the parts defining a segment of the score operable as a rearrangable element;

the parts having types defining the functions of a start, middle and end, the middle parts resizable such that they are repeatable to provide a consistent rendered listening experience over a desired predetermined duration;

the defined function defining a relation between each part of the plurality of parts, each part having a type, to indicate which part types may follow other part types in the particular order of the recombined sequence; and a part discriminator operable to recognize a function to each of the parts, the function indicative of the order of the part as a rearrangable element, the parts responsive to the rearranger to recombine the parts in a particular order based on the function, the combined parts having a total aggregate duration based on a user specified time, the part discriminator further configured for identifying each part as resizable or not resizable, and for storing an attribute indicative of resizability.

12. The device of claim 11 wherein each of the parts further includes at least one part variation, each of the part variations having an independent length, the part variations based on the part and operable to provide a similar audio output, the decomposer is further operable to compute, for each part, at least one track indicative of a subset of sources generating the audio information in the part.

13. The device of claim 12 wherein the rearranger is further operable to:

select, based on the function, a next part variation from the part variations, the next part variation having a corresponding function and corresponding duration such that the total duration of all the parts is substantially equal to an intended duration;

rearrange the parts by ordering and replicating the selected part variations to generate an aggregation of parts having a predetermined duration; and iterate the step of selecting to add next part variations to the aggregation of parts.

14. The device of claim 13 wherein the rearranger further comprises a recombiner operable to combine a plurality of the parts based on the length such that a total length of all the parts substantially equals a desired duration.

15. The device of claim 11 wherein the decomposer is operable to identifying segments of the score adaptable as recombinable parts of audio information, each of the parts operable to follow other particular parts in a sequence of parts;

determine, for each of the parts, a function indicative of an ordering of the parts in a recombined audio piece; and store the parts and corresponding variations in a manner accessible to a rearranger operable to rearrange the part variations according to the desired predetermined duration.

16. The device of claim 15 wherein the decomposer is further operable to decompose a musical score into parts based on the duration and attributes of the parts, the attributes further defining renderable features of the audio contained in the part.

17. The device of claim 16 further comprising a graphical user interface (GUI), the parts responsive to the GUI, the GUI further operable to rearrange the parts in an aggregation of parts, rearranging further comprising adding a next segment to a current aggregation of part variations, the next segment comprising a part variation, further including computing a part variation for the next segment by identifying a part variation having a corresponding function and corresponding length.

18. The device of claim 17 wherein each part has at least one track operable to render audio content, each part having at least one clip adapted to contain audio information.

19. A non-transitory computer-readable medium containing a data structure for use in storing a musical score as audio data, the data structure containing:

a plurality of bins, each bin representing a segment of the musical score adaptable as recombinable parts of audio information, each of the parts operable to follow other particular parts in a sequence of parts;

the parts having types denoting the functions of a start, middle and end, the middle parts resizable such that they are repeatable to provide a consistent rendered listening experience over a desired predetermined duration;

the assigned function defining a relation between each part of a plurality of parts, each part having a type, to indicate which part types may follow other part types in the particular order of the recombined sequence;

for each of the bins, a function indicative of an ordering of the parts in a recombined audio piece;

for each of the bins, a type indicative of a relative location of each of the parts in a recombined audio piece, the type identifying each part as resizable or not resizable, and stored in an attribute indicative of resizability;

for each of the bins, at least one part variation of the part, each of the part variations of a part having a different duration, the duration of the part variations adapted to for computing an aggregate time duration of a recombined sequence of parts;

for each of the part variations, at least one track, each track operable to render audio content; and the bins responsive to an audio application operable to combine the part variations based on the function and duration to generate a recombined sequence having a predetermined timelength, the function indicative of the ordering of the combined part variations.

20. The data structure of claim 19 wherein the bins are adapted for storing the parts and corresponding part variations in a manner accessible to a rearranger operable to rearrange the part variations according to a desired predetermined duration.

21. The method of claim 6 wherein the function defines a relation between the parts to indicate which part types may follow other part types in the particular order of the recombined sequence.

22. The method of claim 21 wherein the part types denote the functions of a start, middle and end, and that the middle parts are resizable such that they are repeatable to provide a consistent rendered listening experience over the desired predetermined duration.

23. The method of claim 1 further comprising recombining parts of a type middle and having a resizability attribute by aggregating the resizable parts for accommodating the predetermined duration.

* * * * *